Jan. 22, 1957  J. R. ALTIERI  2,778,994
METHOD OF AND APPARATUS FOR NOISE MEASUREMENT
OR INDICATION IN AN ELECTRIC CIRCUIT
Filed May 14, 1953  3 Sheets-Sheet 1

INVENTOR.
Joseph R. Altieri
BY Alois W. Graf
Attorney

Fig. 2a.

INVENTOR.
Joseph R. Altieri
BY
Alois W. Graf
Attorney

Fig. 2b.

United States Patent Office 2,778,994
Patented Jan. 22, 1957

2,778,994

METHOD OF AND APPARATUS FOR NOISE MEASUREMENT OR INDICATION IN AN ELECTRIC CIRCUIT

Joseph R. Altieri, Watertown, Mass., assignor, by mesne assignments, to Acton Laboratories, Inc., Acton, Mass.

Application May 14, 1953, Serial No. 355,104

18 Claims. (Cl. 324—63)

The present invention relates to a method of and apparatus for determining the equivalent noise resistance in a network, and more particularly to noise resistance of a movable contact of a potentiometer.

A precision potentiometer comprises a resistor having at least two terminals, one at each end. Some potentiometers have intermediate taps but for the present purposes they need not be considered. A movable contact engages intermediate points along the resistor. Noise appears between the moving contact and the resistor which has a resistance characteristic, although transient in character. Noise therefore appears electrically as the third resistance element of a Y network. This has been defined as the equivalent noise resistance. It is the purpose of the present invention to measure or indicate the transient peak value of the equivalent noise resistance as the third leg of a Y network wherein the resistor of a potentiometer comprises two legs of the Y network.

Noise is of fundamental importance in the physical and engineering sciences in considering communication and the utilizing of intelligence. Noise places a limit on the useful operating or dynamic range of electronic and electromechanical mechanisms. In general internal noise is that portion of the output of any system, not originally present in the input signal, and not directly attributable to specifically prescribed operations on the input by the system.

In the manufacture of precision potentiometers the noise developed as a direct result of the actuation of the potentiometer shaft carrying the movable contact is of great importance. The importance of noise developed by precision potentiometers has heretofore been the subject of various investigations. In one investigation an attempt was made to discover a wire and contact material combination which would reduce the noise output as well as enhance the longevity of a potentiometer in motor driven applications. This investigation used as a criterion for the noise characteristic of a potentiometer, the widening of a resolution pattern of a cathode ray oscillograph for observing a motor driven potentiometer as compared to the voltage output of a standard master precision potentiometer. The difference output between the potentiometer under investigation and the master potentiometer was supplied to a very high impedance amplifier for operation of an oscillograph. This observation of the widening of the resolution pattern was a satisfactory indication of potentiometer noise only when it was integrated into a system having input characteristics similar to the amplifier used in the test. The use of amplifiers of this type, however, was not feasible for production testing.

Another system for attempting to isolate noise generation in a precision potentiometer was predicated on the assumption that for all practical purposes the contact arm on the winding was either perfect or was essentially open circuited as a result of foreign material lodged on the wiper track of the resistance element. For this purpose an oscillograph was employed and reliance was placed on the widening of the time trace of the oscillograph base. In a variation of this system the potentiometer was excited from a voltage source and a resolution pattern was observed which depended upon the sweep frequency of the oscilloscope and the speed of rotation of the potentiometer. Neither of these variations gave any quantitative indication of the nature of the noise characteristic of the potentiometer under investigation.

An attempt to deal quantitatively wih the noise characteristic was made by exciting the potentiometer with a specified voltage through a specified series resistance. The output of the potentiometer was applied to an oscilloscope on which less than the specified number of voltages were taken as a criterion to determine satisfactory and unsatisfactory potentiometers. Such an arrangement, however, has the disadvantage in that the sensitivity of the test varies with the position of the contact arm on the winding, with the total resistance of the potentiometer, with the series resistance and with the magnitude of the voltage source. It has the further disadvantage common to all oscilloscope tests for potentiometer noise, in that it requires the human operator to discern almost small instantaneous flashes in the oscilloscope pattern which are not periodic, and which are of relatively small luminous intensity. If the sensitivity of the system is increased, this difficulty becomes greater because the largest part of the indication of a noise pulse may fall beyond the oscilloscope screen which may or may not be observed by the operator.

Noise in potentiometers is perhaps primarily of two types, active and passive. Active noise may be said to consist of voltages appearing at the output terminals of a potentiometer even though the potentiometer is not excited when actuated. Such noise may be due to thermal electric effects, heating of dissimilar metals as when precious metal contacts are supplied over a resistance wire upon operation of the rotor, changes in the relative work function as the sliding contact shifts from one type of resistance wire to another or from the terminating travel portion to the resistance winding, and due to chemicoelectric effects resulting from moisture contact and residual, chemical or soft materials on the winding element.

Passive noise in a potentiometer includes contact resistance variations resulting from variations in contact pressures, and discontinuities in contacting surfaces when the sliding contact is moved from one part of the winding to another part. It also may be due to a lack of homogeneous specific resistance at the surface or skin of the wire of the resistance element as a result of local crystallization or oxidation, or it may be due to embedded foreign material in the winding.

Hence it is apparent that noise in a potentiometer may result from a multiplicity of causes. In commercial production of potentiometers it would appear that passive noise might be more susceptible of control in the manufacturing process. It further becomes evident that noise in a precision potentiometer has for some time eluded satisfactory definitions. It, therefore, seems desirable to define potentiometer characteristics, and particularly the noise characteristics as a physical property of the potentiometer independent of the test method and mechanical and electrical parameters of the potentiometer.

Since it is not at all certain that there is available complete information concerning the cause of potentiometer noise in any particular unit, a definition is proposed which quantitatively defines noise in terms of an equivalent noise resistance. While such definition may not be subject to profound mathematical analysis such as that employed in determining the equivalent noise resistance relative to atomic motion, the equivalent is of convenience to bring a multiplicity of noise causes down to a common level so that they may be subject to quantitative evaluation.

Therefore, noise may be defined quantitatively in terms of an equivalent parasitic, transient, contact resistance in ohms appearing between the wiper contact arm and the resistance winding of a precision potentiometer when the wiper arm is actuated. The equivalent noise resistance is defined independent of the total resistance, the resolution, the physical characteristic, the total travel, and the speed of operation of the wiper arm of the potentiometer. The magnitude of the equivalent noise resistance is taken as the peak value obtained. The slider or contact arm of the potentiometer is arbitrarily required to be excited by a current of 1.0 milli-ampere or the data corrected to refer to this standard condition.

In the above definition, one milli-ampere exciting current is specified to provide a common basis for standard measurements. This figure is quite arbitrary, and should not be considered to be completely restrictive. It is evident that it may prove desirable to make measurements at some other value of current. There are many reasons for this; only three of which will be outlined below. Additional reasons will come to mind to individuals skilled in this art.

There is evidence to indicate that the value of the equivalent noise resistance may depend upon the magnitude of the exciting current. This appears particularly true in regard to the passive component of the equivalent noise resistance. It has been discovered that in some cases this passive component possesses a current sensitivity as a non-linear characteristic, and for certain applications, it may be desirable to ascertain the nature of this non-linear characteristic by making equivalent noise resistance measurements, e. g., from 1 micro-ampere to 10 milli-amperes, and plotting the equivalent noise resistance values so obtained.

An additional reason for desiring to make the equivalent noise resistance determination at some value other than 1 milli-ampere may be evident to those skilled in the art of computer design and potentiometer specification standardization when considering the relation of the influence of the active and passive components of the equivalent noise resistance of the potentiometer on the system under consideration. The active portion of the equivalent noise resistance usually has its peak magnitude (threshold of acceptable performance) determined by the amount of gain present following the potentiometer element and by the relation of the designed output voltage of the potentiometer to the magnitude of the active portion of the equivalent noise resistance present. This ratio is a type of signal-to-noise ratio.

The passive portion of the equivalent noise resistance usually has its largest usable peak magnitude established in terms of the amount of ohmic resistance present in the circuit which is excited by the potentiometer. In some cases, in addition to this, the threshold of acceptance is established by the relation between the amount of spurious A. C. pickup in the circuit excited by the potentiometer at high impedance levels and by the recovery time characteristic of the succeeding amplifiers when saturated by the aforementioned stray pickup.

In the light of these considerations, it is evident that the fullest flexibility of the equivalent noise resistance definition may be obtained and a tremendous practical advantage simultaneously accrued in regard to simplifying Production and Engineering Testing of potentiometer assemblies by assigning arbitrarily a value of exciting current in conjunction with the equivalent noise resistance determination, which will cause the same magnitude of disturbing effect upon the system by the active components and the passive components of the equivalent noise resistance, acting alone.

Thirdly it is evident that by assigning a very large value of exciting current during the equivalent noise resistance determination, the passive components of noise may be determined in peak magnitude essentially independently of the active noise present. Similarly, by arbitrarily requiring the exciting current to be zero, the active components of the potentiometer noise may be ascertained essentially independent of the passive noise present.

Having defined the equivalent noise resistance, it now would be desirable to provide an apparatus particularly suited for determining the equivalent noise resistance in ohms independent of the total resistance of the potentiometer or circuit, the physical characteristic, the total electrical angle, the resolution, and the speed of operation. While the speed of operation may affect the equivalent noise resistance measured in a potentiometer, it can, however, become invariant by excluding resolution and the speed of operation.

In accordance with the present invention there has been provided a system for determining the equivalent noise resistance of potentiometers, of Y-connected networks and contacts. To eliminate subjectiveness of the test where the human operator may or may not discern small or excessively large extremely transient noise variations, a visible and an audible signal of predetermined magnitude are provided upon the occurrence of a parasitic or transient variation in the contact resistance, contact voltage, or a combination thereof, in excess of a predetermined magnitude.

It, therefore, is an object of the present invention to provide a system of measurement of the equivalent parasitic transient contact resistance between a contact arm or slider and the resistor element of a potentiometer.

A still further object of the invention is to provide a system for determining this equivalent noise resistance in an electric circuit.

A further object of the invention is to provide a system for the measurement of equivalent noise resistance in potentiometers and variable resistors.

A still further object of the invention is to provide a system for the measurement of equivalent noise resistance between two electric contacts.

A further object of the invention is to provide a go, no-go tester for checking potentiometers and variable resistors with respect to a predetermined noise level.

Still another object of the invention is to provide a system for the measurement of the magnitude of the equivalent noise resistance in an electric network or in a potentiometer.

Still another object of the invention is to provide a potentiometer noise tester which will give uniform indications, visual and oral, independent of the transient characteristic of the noise resistance.

A further object of the invention is to provide a peak reading, voltage sensitive circuit for testing or determining the electric variations in electric contacts.

Still another object of the invention is to provide a peak reading, voltage sensitive circuit for testing potentiometers for equivalent noise resistance.

A further object of the invention is to provide a method for testing potentiometers and eliminating subjective characteristics in testing.

Still another object of the invention is to provide a method for measuring contact resistance of a slider or contact arm of a potentiometer independently of its position on its resistance element, or the resistance value of the resistance element.

A further object of the invention is to provide an improved method for measuring the contact resistance of a slider or contact arm of a potentiometer irrespective of its position on the resistance element, and irrespective of the linearity, non-linearity or total resistance value of the resistance element.

A further object of the invention is to provide a method of positive indication of definite duration independently of the transient nature of network noise whenever a pre-determined peak value is exceeded.

A still further object of the invention is to provide a method of and apparatus for measuring the resistance of one leg of a Y-connected network irrespective of the resistance values of the other two legs of the network.

Other and further objects of the invention subsequently will become apparent by reference to the following description taken in conjunction with the accompanying drawings wherein.

Figures 1, 3:
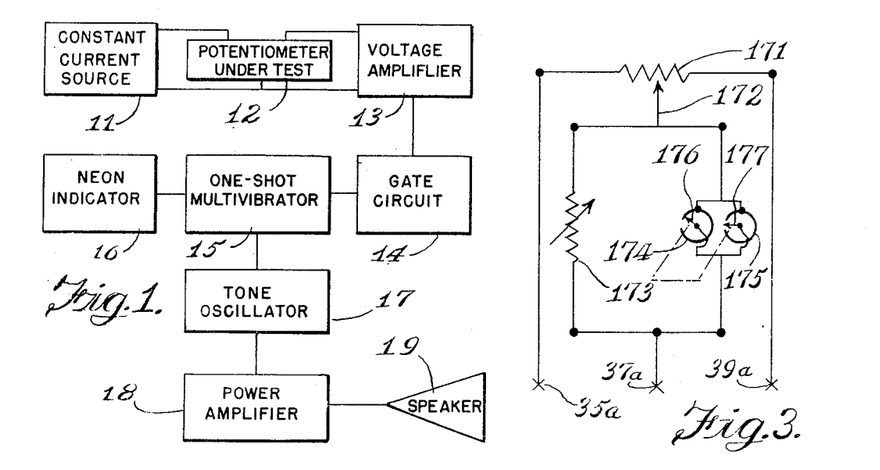
Figure 1 is a block diagram of the system of the present invention for testing Y-connected networks and potentiometers.
Figure 3 is a circuit diagram of a standard equivalent noise resistance synthesizer circuit.

Referring to Figure 1 of the drawings it will be seen that the block diagram shows that the system contemplated in accordance with the present invention employs a constant current source 11 which is connected to a potentiometer 12 which is under test. The potentiometer 12 is also connected to a voltage amplifier 13 having its output connected to control a gate circuit 14. The gate circuit in turn controls a one shot multivibrator 15 which controls or actuates a neon indicator 16 thus providing a visual indication upon the occurrence of a certain condition or whenever a predetermined condition has been exceeded. The one shot multivibrator 15 is also connected to control a tone oscillator 17 which is coupled through a power amplifier 18 to a loud speaker 19. The operation of the one shot multivibrator therefore produces a visual indication by control of the oscillator 17 which is amplified by the power amplifier 18 and reproduced as a tone by the speaker 19. The one shot multi-vibrator provides an indication of known duration independent of the transient characteristic of the equivalent noise resistance. The gate circuit 14 establishes the go, no-go characteristic set for the particular potentiometer under test and also the width of the zone of ambiguity.

The block diagram of Figure 1 is embodied commercially in a single instrument having three "input" terminals which are connected to the end terminals of a potentiometer resistor and to the movable contact terminal. The shaft of the potentiometer then is rotated. If the movable contact or wiper at any instant makes imperfect contact, the operator will be notified by a visual indication and an audible indication. These indications are of a predetermined duration and do not depend upon the duration or magnitude, beyond the set threshold, of the transient imperfect contact known as noise. Any potentiometer tested, which results in such indication, falls into the no-go classification.

Figure 2A:
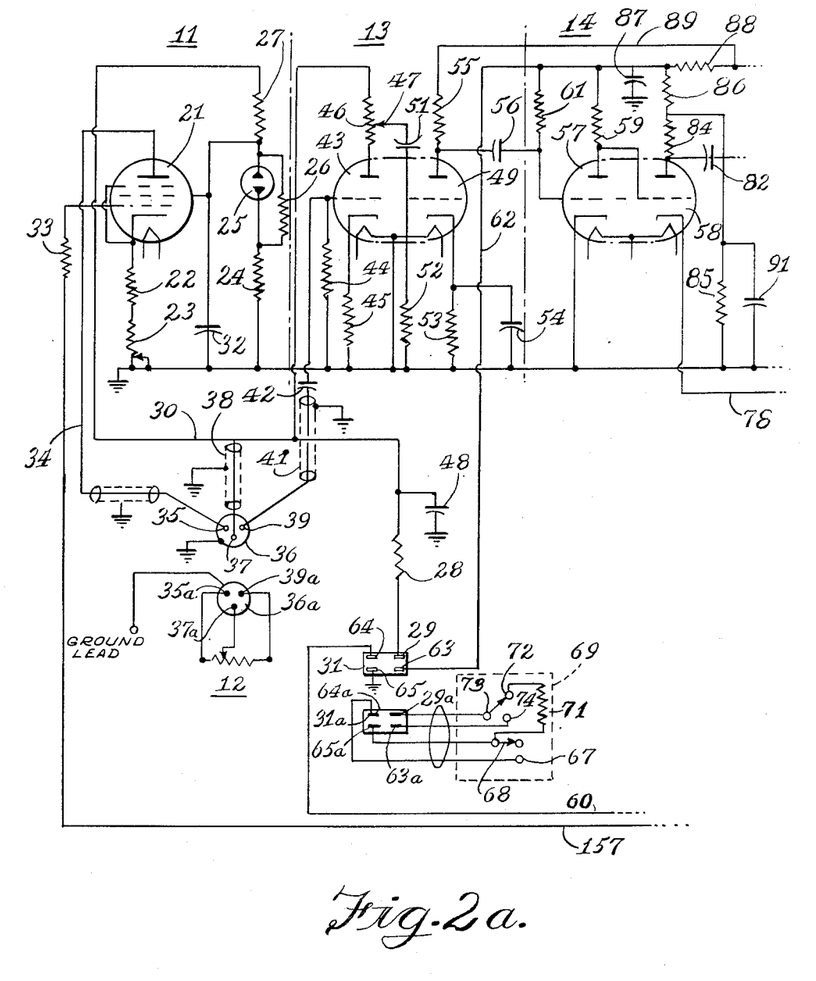
Figures 2a and 2b are a detailed circuit diagram of the system illustrated in Figure 1.
Figure 2B:
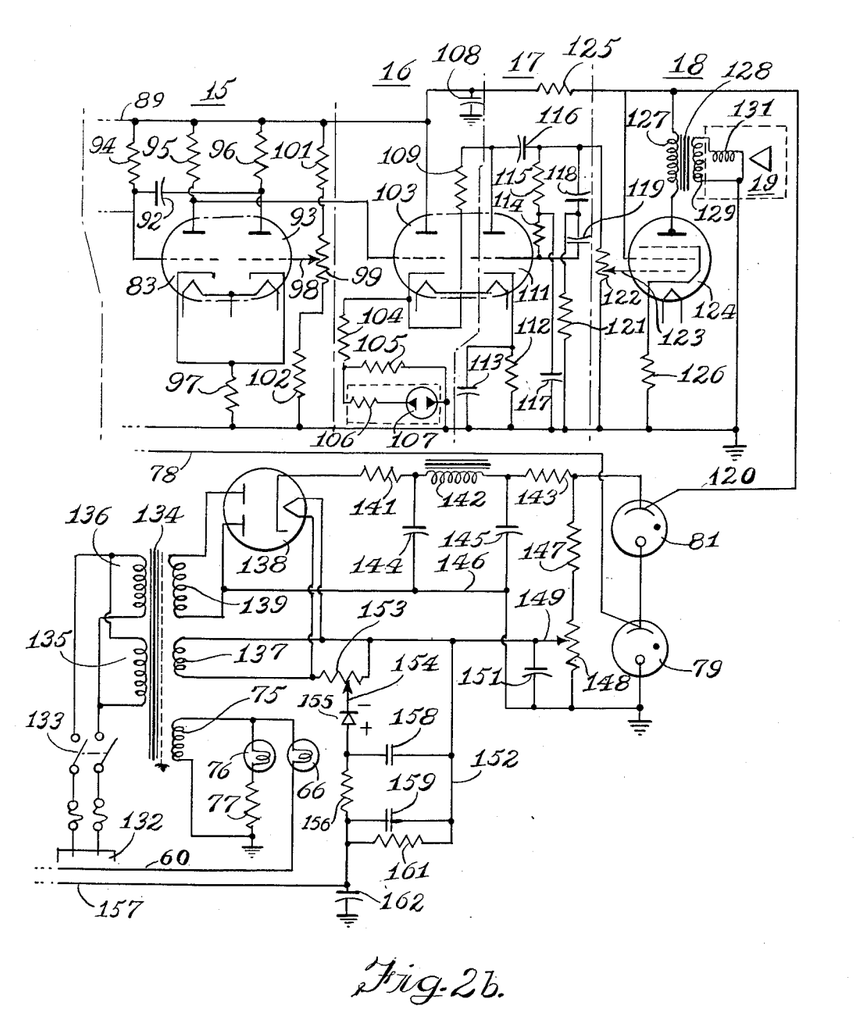

Before explaining in further detail the operation of the present invention it is believed that reference may better be had to Figures 2a and 2b so that those skilled in the art may appreciate the circuit details of the system set forth in block diagram in Figure 1. The constant current source 11 employs a pentode vacuum tube 21 having a fixed cathode resistor 22 and an adjustable cathode resistor 23 so that the value of the constant current to be supplied may be adjusted. The screen grid of the vacuum tube 21 is connected to a circuit which includes a resistor 24 having one end connected to ground, a neon lamp 25 shunted by a resistor 26 and a series resistor 27 connected to a conductor 30 extending to a resistor 28 which is connected to a terminal 29 in a socket 31. The neon bulb 25, resistors 24 and 26, capacitors 32, together with resistor 27 comprise a sensing circuit wherein the neon bulb 25 serves as an indicator. Positive indication is given by the extinguishing of this neon lamp when the resistance in the plate circuit of the pentode 21 exceeds by an appropriate amount 100,000 ohms or some other designed value as is established by the external circuit between the contacts 35 and 37 of jack 36. This external circuit includes, in the maximum case, the total resistance of the potentiometer 12 under test and the contact resistance in the slider circuit. The neon lamp 25 therefore provides positive indication when the contact of the potentiometer under test is off the active portion of the potentiometer element. Furthermore, the capacitor 32 provides for a controlled amount of integration so that this indicator circuit is not actuated by exceedingly large noise impulses of short duration. A suitable by-pass capacitor 32 is connected between ground and the screen grid. The control grid of the vacuum tube 21 is connected through a resistor 33 to a portion of the voltage supply system for the apparatus. The anode of the vacuum tube 21 is connected through a shielded conductor 34 to the contact 35 of a socket 36. The contact 37 of the socket 36 is connected through a shielded conductor 38 to one terminal of the resistor 27 forming a part of the circuit to which the screen grid is connected. Another contact 39 of the socket 36 is connected through a shielded conductor 41 to a coupling capacitor 42 which is connected to the grid of a triode 43 which forms a part of the amplifier 13.

The constant current supplied by the source 11 which includes the vacuum tube 21 is connected to the potentiometer 12 under test by means of a plug 36a having a contact 35a which engages the female contact 35. The contact 35a is connected to one terminal of the resistance element of the potentiometer 12. The contact 37a is connected to the movable contact or wiper arm of the potentiometer 12. The remaining contact 39a is connected to the other terminal of the resistance element of the potentiometer 12.

The grid circuit of the vacuum tube 43 of the amplifier 13 is provided with a grid to ground resistor 44. The cathode is provided with a cathode to ground resistor 45. The anode of the vacuum tube 43 is provided with an anode resistor 46 having an adjustable contact 47. One terminal of the resistor 46 is connected to the common juncture between the resistors 27 and 28, and this common juncture is also connected to a capacitor 48 having its other terminal connected to ground.

The amplifier 13 also includes a second triode portion 49 having its grid connected through a coupling capacitor 51 to the adjustable contact 47 of the resistor 46. In the go, no-go instrument contemplated by the present invention the adjustable contact 47 is set by a screw driver adjustment within the cabinet of the apparatus. If it were desired to measure the particular value of contact resistance, the contact 47 could be connected to a suitable indicating dial thus to provide an actual indication of the resistance value. The grid of the triode portion 49 of the amplifier 13 is provided with a grid to ground resistor 52 and a cathode is provided with a grid to ground resistor 53 which is by-passed by a capacitor 54. The anode of the triode 49 is provided with an anode coupling capacitor 56 to the grid of the triode 57 forming a portion of the gate circuit 14. The cathode of the triode portion 57 is connected directly to ground. The anode of the triode portion 57 is connected to the grid of a second triode portion 58 and to an anode resistor 59. A grid resistor 61 is connected to one terminal of the anode resistor 59 and which extends to a contact 63 in the socket 31.

The socket 31 has a contact 64 connected by conductor 60 to an indicating lamp 66. The socket 31 also has a contact 65 which is grounded. The contact 64a is connected to a contact 67 arranged to be engaged by the switch blade 68 of a foot switch 69. The contact arm or switch blade 68 is connected to the contact 65a which is grounded at 65 and to one end of a resistor 71. The other end of the resistor 71 is connected to a contact 72 which is manually engaged by a switch blade or arm 73 which is connected to the contact 29a. When the foot switch 69 is actuated, the two switch blades 68 and 73 are moved downwardly so that the switch blade 73 engages a contact 74 which is connected to contact 63a thus completing a circuit between the conductor 62 and one terminal of the resistor 28. The closing of the switch 68 completes a circuit between the grounded contact 65 and the contact 64 which is connected to the indicating lamp 66 which becomes illuminated to indicate that the foot switch has placed the apparatus in operation. The lamp 66 has one terminal connected to one end of a transformer secondary winding 75 having its other end connected to ground. The transformer winding 75 also supplies power to an electric circuit including an indicating lamp 76 and a series resistor 77. The lamp 76, therefore, is illuminated whenever the transformer of which the secondary winding 76 is a part has been energized. The foot switch 69, therefore, merely completes a circuit so that current can be applied to the potentiometer under test, and during the times that the switch 69 is not being operated the potentiometer may be handled without fear of any shock or injury to the operator.

The cathode of the triode portion 58 of the gate circuit 14 is connected to a conductor 78 which is connected to the high voltage source employing two voltage regulator tubes 79 and 81. The anode of the triode portion 58 is coupled through a capacitor 82 to the triode portion 83 of the multi-vibrator 15. The anode of the triode portion 58 is provided with an anode resistor 84 having one end connected to the common juncture between a resistor 85 having one end connected to ground and a resistor 86 having one end connected to the conductor 62 which is by-passed to ground by a capacitor 87. The conductor 62 is connected through a resistor 88 to a conductor 89 which leads to the anode resistor 55 of the preceding amplifier triode 49 of the amplifier 13. The resistor 85 is provided with a by-pass capacitor 91.

The grid of the triode portion 83 of the multi-vibrator 15 is connected to a coupling capacitor 92 to the anode of a triode portion 93 of the multi-vibrator 15. The grid of the triode portion 83 is connected through a resistor 94 to the conductor 89. The anodes of the triode portions 83 and 93 are connected through anode resistors 95 and 96 respectively to the conductor 89. The cathodes of the triode portions 83 and 93 are connected to a cathode to ground resistor 97. The grid of the triode portion 93 of the multi-vibrator 15 is connected to a movable contact 98 of a resistor 99 which is connected by the series resistors 101 and 102. Thus the circuit including the resistor 99, resistors 101 and 102 extends between the grounded conductor and conductor 89. The anode of the triode portion 83 of the multi-vibrator 15 is connected to the grid of a triode portion 103 of the neon indicator circuit 16 which has its anode connected directly to the conductor 89. The cathode of the triode portion 103 is connected to a circuit which includes a series resistor 104 connected to a parallel circuit including a resistor 105 parallel to a circuit comprising a resistor 106 in series with a neon lamp 107 which in turn is connected to the grounded conductor. The neon lamp 107 becomes illuminated whenever the triode portion 103 responds to the one shot multi-vibrator 15. The anode of the triode portion 103 is connected to a by-pass capacitor 108 which in turn is connected to ground. The cathode of the triode portion 103 is connected through a resistor 109 to the anode of another triode 111 which is a portion of the oscillator circuit 17. The cathode of the triode portion 111 is connected to ground through a resistor 112 which is by-passed by a capacitor 113. The grid of the triode 111 is connected to one terminal of a resistor 114 which is connected to a resistor 115 having its terminal connected to a capacitor 116 which is connected to the anode of the triode 111. The common juncture between resistors 114 and 115 is connected through a capacitor 117 to ground. The juncture between the resistor 115 and capacitor 116 is connected to one terminal of a capacitor 118 which is connected to another capacitor 119 having its terminal connected to the grid of the triode 111. The common juncture between the capacitors 118 and 119 is connected through a resistor 121 to ground. The common juncture between the capacitor 116, the resistor 115 and the capacitor 118 is connected to one terminal of a resistor 122 having its other terminal connected to ground and being provided with an adjustable contact 123 which is connected to the electrode of a pentode 124. The screen grid of the pentode 124 is connected through a resistor 125 to the conductor 89. The screen grid is also connected directly to a conductor 120 which is connected to the high voltage end of the voltage regulator tube of the power supply. The cathode of the pentode 124 is connected through a biasing resistor 126 to ground. The anode of the pentode 124 is connected through the primary winding 127 of a transformer 128 to the conductor 125. The secondary winding 129 of the transformer 128 is connected to the voice coil 131 of the loud speaker 19.

The apparatus thus far described is arranged to be energized from a suitable source of alternating current 132 connected through a switch 133 to a transformer 134 having parallel connected primary windings 135 and 136. A secondary winding 137 supplies filament current to a rectifier 138 which has its anodes connected to the other terminals of a center tapped winding 139 forming the remaining secondary of the transformer 134. The cathode of the rectifier 138 is connected to one side of a filter circuit which includes a resistor 141, a choke coil 142 and a resistor 143. Filter capacitors 144 and 145 interconnect opposite terminals of the choke coil 142 with a conductor 146 which is connected to the mid tap of the transformer secondary winding 139. The two voltage regulator tubes 79 and 81 are connected between the one terminal of resistor 143 and the conductor 146. In parallel with the voltage regulator tubes is a resistor circuit including a resistor 147 and a resistor 148. The resistor 148 has an adjustable contact 149 which is connected by a capacitor 151 to the conductor 146 which is grounded. The adjustable contact 149 is connected to one terminal of the secondary winding 137 and to a conductor 152 forming a part of a filter circuit. Connected across the winding 137 is a resistor 153 having an adjustable contact 154 connected through a unilateral conductor device or rectifier 155 to a filter circuit which includes a resistor 156 connected to a conductor 157 which in turn connects to one terminal of the grid resistor 33 of the triode 31 of the current source 11. The common juncture between the resistor 156 and the rectifier 155 is connected to a capacitor 158 which in turn is connected to the conductor 152. The other terminal of the resistor 156 is connected to a capacitor 159 which in turn is connected to the conductor 152. A resistor 161 is connected between the conductor 152 and one terminal of the resistor 156. The conductor 157 is connected to one terminal of a capacitor 162 which in turn is connected to ground.

The adjustments provided by the contacts 154 and 149 serve to establish the adjustment of the current source stabilizing circuit, comprising resistors 153, 147, 148, 161, 156, and 33; conductor 157, non-linear impedance 155 and capacitors 151, 158, 159 and 162, with transformer winding 137. This circuit makes possible very accurate steady state compensation for the quiescent operating conditions of the pentode 21 so as to cancel out shifts in operating characteristics resulting from variations in heater voltage under conditions of varying power line voltage; thereby enabling the maintenance of constant current through the contactor 35 and the potentiometer under test to a very precise degree.

The apparatus comprising the system set forth in the circuit diagram of Figures 2a and 2b is primarily intended to be used for production testing of potentiometers. An apparatus of this type may be employed advantageously for an engineering analysis of the performance of potentiometers specifically, and electric contacts in general, considerations of design and development as well as for engineering evaluation of potentiometer performance in a system in terms of its noise characteristics. Several variations and elaborations of the system set forth in the design of Figures 2a and 2b have already been investigated and include such variations as additional amplification to allow operation at lower equivalent noise resistance levels, calibrated attenuation and amplification to facilitate convenient adjustment of the go, no-go threshold, elaboration of the current source to permit operation at a wide variety of currents, automatic drive mechanisms to control the operation of the potentiometer actuator, and elaboration of the circuit involving jack 36 to simultaneously enhance shielding for low level operation and minimization of stray capacity. Heretofore it has been common to define an unsuitable potentiometer by the expression that it has an "open." In the past to some engineers the term "open" would mean a completely open circuit or an essentially infinite resistance between the potentiometer winding and the adjustable contact or slider. Such concept is satisfactory where the precision potentiometer is applied in a circuit where the slider or contact arm is connected to the grid circuit of a cathode follower or other high impedance device. It is now evident that this concept is merely a degenerate form of the very general concept of equivalent noise resistance propounded by this inventor for the case where the equivalent noise resistance is very, very large (equals infinity or essentially so). This limited degenerate case, however, has proved itself unsatisfactory in those potentiometer applications where the slider or contact arm is loaded or connected to another potentiometer as in the case of analogue computer multiplying circuits, or by a fixed resistor when the shaft of the precision potentiometer is being rotated. An "open" for the purposes of the present invention is defined as a malfunctioning characteristic of a precision potentiometer involving a parasitic transient resistance between the wiper arm and the actual point of contact on the resistance element winding when the wiper arm is being actuated. To be strictly correct, however, the use of the term "open" should be restricted to refer to equivalent noise resistances of exceedingly large magnitude as mentioned above. Determination of such malfunction should be entirely independent of the potentiometer characteristic, the speed of the test, and the operator. For certain purposes it is desirable to limit the equivalent transient resistance to a particular ohmic value. In order to adjust the circuit shown in Figure 1 to a particular standard it is convenient to employ a standard "open" or standard equivalent noise resistance synthesizer shown in circuit diagram in Figure 3. It will be noted that a male plug similar to 36a shown in the circuit diagram of Figures 2a and 2b may be employed to connect the standard "open" to the circuit of Figures 2a and 2b. A potentiometer having a resistance element 171 may be connected to the contacts 35a and 39a. When this potentiometer is employed, the position of its slider synthesizes the slider position of an actual potentiometer under test by inserting into the current source leg, or the measurement circuit leg, a value of series resistance to be synthesized. The operation of the circuit of Figure 2 is adequately trustworthy so that the resistance element 171 is not required when the calibration of the circuit of Figures 2a and 2b is the only purpose for which the synthesizer is employed. In such cases the contacts 35a and 39a may be joined by a conductor and joined to the wiper arm 172, in the diagram of the equivalent noise resistance synthesizer of Figure 3. In many other applications, the resistance element 171 may be important; one such application will be described later. The adjustable contact or wiper arm 172 is connected through two circuits, one of which includes an adjustable resistor 173 to the contact 37a. The other circuit between the contact 37a and the contact arm 172 includes a pair of electric switches arranged in parallel. These switches have conductive segments 174 and 175 provided with a gap of any convenient length. Two contact arms 176 and 177 are connected to a common actuating shaft and so arranged that these contact arms may be displaced relative to each other in a range from .05° to 2.0°. It will be noted that the two contact arms 177 and 176 serve to short circuit the adjustable resistor 173 for a predetermined portion of the total actuator position which may be adjusted by changing the relative position of conductive segments 174 and 175. The adjustment of the resistor 173 which conveniently may be a calibrated rheostat or a decade box, determines the value of the resistance which may appear between the contact 37a and the wiper arm 172 of the standard potentiometer. The decade box may be set within a range from ten ohms to approximately five thousand ohms. By connecting the standard equivalent noise resistance synthesizer shown in Figure 3, the adjustable contact 47 on the resistor 46 of the amplifier 13 may be adjusted so that no signal is produced when the wiper arms 176 and 177 are caused to rotate through the gap of the conductive segments 174 and 175 and the adjustable resistor 173 is set to a value slightly less than the desired threshold value. The operation of this circuit may be observed from Figures 2a and 2b. On the other hand, when the actuator of contacts 176 and 177 is rotated through the aforementioned gap, a signal should be produced for adjustments of the resistor 173 equal to or greater than the desired threshold value for the circuit of Figures 2a and 2b. The speed of operation of the switch arms 176 and 177 would correspond to the speed of rotation of a potentiometer under test. The angular duration of the open circuit condition of these switches corresponds to the angular duration of a simulated equivalent noise resistance condition. Hence it is possible to adjust the circuit of Figures 2a and 2b to determine the range of ambiguity. When the resistor 173 is adjusted to a value greater than that desired for the go, no-go condition there should be no ambiguity in the operation of the circuit of Figures 2a and 2b since it should consistently indicate the presence of an "open" circuit. When the resistor 173 is set somewhat less than the critical value, the circuit of Figures 2a and 2b should never give any indication irrespective of the rotation of the switch arms 176 and 177. In the particular embodiment contemplated the zone of ambiguity is found ± (1.5% of the adjusted value of the resistor 173 + two ohms).

Figure 4:
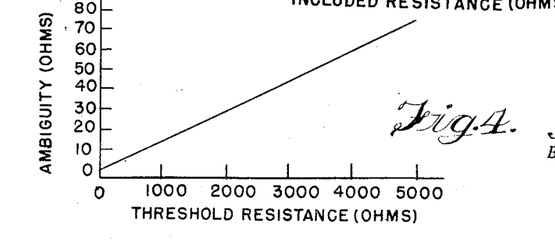
Figure 4 is a graph showing a typical sensitivity characteristic of the circuit of Figure 1.

This relation with respect to ambiguity is illustrated graphically in Figure 4 wherein ambiguity expressed in (± ohms) was plotted across threshold resistance (ohms). It is believed that those skilled in the art will require no further explanation of the meaning of this graphical representation.

The utility of the equivalent noise resistance synthesizer of Figure 3 as an instrument to facilitate the adjustment of the go, no-go threshold of the circuit of Figures 2a and 2b as well as to make possible a determination of the zone of ambiguity has been discussed. An interesting application for the apparatus of Figure 3 for experimentally determining the peak magnitude of the passive portion of the equivalent noise resistance, of any potentiometer, that will produce a predetermined amount of disturbing effect on a system under investigation will now be outlined.

The resistance element 171 of Figure 3 is connected into the system as the potentiometer under investigation, and contactor 37a is connected to the system as the slider. The actuator of contacts 176 and 177 is operated at the same speed as the actuator for contact 172. The calibrated rheostat or decade box 173 is adjusted to various values of equivalent noise resistance to be simulated and the system response evaluated by an engineer, technician, or other person skilled in this art. When a predetermined amount of disturbing effect on the system obtains the threshold magnitude (level of acceptability) of the equivalent noise resistance appearing on the circuit may be pre-set to any desired value between the calibration of rheostat 173 is noted.

It is clearly evident that disturbing effect of the active portion of the equivalent noise resistance or any combination of active and passive portions may similarly be synthesized.

Figure 5:
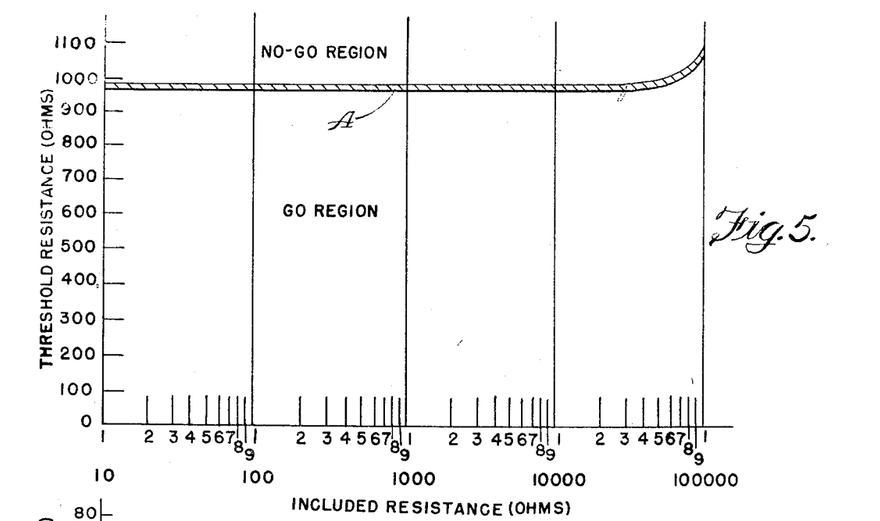
Figure 5 is a graph showing the typical accuracy and precision results to be obtained by the use of the method and system herein described.

Still another way of expressing the operation of the circuit of Figures 2a and 2b and the zone of ambiguity is shown by the graph of Figure 5 wherein the threshold resistance has been shown in ohms as against the included resistance in ohms. Thus for a particular setting of the circuit of Figures 2a and 2b all resistance values below the zone of ambiguity A would appear to pass inspection, and all resistance values which exceed the zone of ambiguity A would be greater than that which has been considered to be permissible, and hence such devices would be rejected. Whenever the circuit of Figures 2a and 2b detects a condition exceeding the zone of ambiguity A of Figure 5, both audible and visual signals will occur. In the zone of ambiguity the circuit of Figures 2a and 2b may or may not respond dependent upon various factors, but the circuit is sufficiently accurate that it is positive that there will be no response when the effective resistance value is anything below the lower edge of the zone of ambiguity A.

The accuracy and reliability of the indication provided by the circuit of Figures 2a and 2b is not appreciably affected by the speed of rotation of the potentiometer slider or contact arm for very low speeds up to about 60 R. P. M. It furthermore is insensitive to the total resistance of the potentiometer provided it is less than 100,000 ohms, and the linearity or non-linearity characteristic of the potentiometer, and the total electrical angle of rotation or resolution. Perhaps a fuller appreciation of the nature of the apparatus provided by the circuit may be had by further consideration of its mode of operation. The potentiometer 12 under test is excited by current applied between the contact 35a and the conductor 37a of the plug 36a. Thus constant current of a known magnitude flows in the potentiometer winding independent of its total resistance, function, linearity or non-linearity, or the instantaneous position of the slider or contact arm. The other end of the potentiometer winding and the slider or contact arm is locked in by a peak indicating voltmeter to provide the oral and visual indication when the peak voltage appearing between contact 39a and 37a of the plug 36a exceeds a predetermined threshold magnitude. The peak indicating voltmeter has a characteristic so that its indication is essentially independent of the widths of the voltage pulses supplied to it, and thus it provides a determination of the continuity characteristic of the potentiometer under test independent of the angular space occupied by the zone of discontinuity. The amplifier 13 which is connected to this portion of the potentiometer under test has an essentially infinite input impedance which does not influence the measurement, and hence only the total transient voltage developed between the actual point of contact of the slider of the potentiometer on the winding and the slider is observed. It has previously been indicated that the circuit has a characteristic that the zone of ambiguity about its threshold adjustment is a minimum. The circuit is further designed to re-set itself after each indication within approximately 0.5 second or less recovery time. The indication provided upon the occurrence of any transient voltage in excess of a predetermined amount in the potentiometer portion which is connected to the amplifier 13 produces an indication for approximately three seconds. This indication is provided by the neon lamp 107 and the audible signal from the loud speaker 19.

Where 360° mechanical rotation potentiometers are to be tested which are completely encased so that the internal construction and operation cannot be observed during the test, the neon indicator lamp 25 would be extinguished when the intended electrical continuity of the winding is exceeded. The threshold resistance value of the circuit may be pre-set to any desired value between 10 ohms and 5,000 ohms by adjustment of the contact 47 on the variable resistor 46 of the amplifier 13.

While for the purpose of simplicity in describing the present invention reference has been had to the use of the circuit and apparatus for the purpose of testing potentiometers, it, of course, will be appreciated that the apparatus is capable of other uses. It will readily be appreciated that the potentiometer 12 under test shown in Figures 2a and 2b actually constitutes a Y-connected network. Hence any other Y-connected network could be substituted for the potentiometer 12 under test. Such an arrangement would therefore make it possible to test contacts such as those used in relays or mechanically operated switches. Thus it is possible to determine the noise introduction of contacts in any electrical circuit arrangements where the contacts are either electrically or mechanically actuated as a part of the operation sequence.

It further will be appreciated that while the foregoing description has been directed to a go, no-go type of operation which defines the greatest utility in production testing operations, that the circuit and apparatus is not limited to such use. It previously has been indicated that an absolute measurement of the slider or contact resistance could be obtained by the use of a suitable calibration dial connected to the adjustable contact 47 of the resistor 46 of the amplifier 13. From this it will be appreciated that further refinements or modifications might be made whereby a suitable attenuator or phase reversal mechanism might be introduced for balancing out the active noise components in a Y-connected network. It further will be appreciated that while in the particular embodiment referred to it has been stated that the sensitivity could be set within a range from 10 ohms to 5,000 ohms that suitable amplification might be provided to extend the range as low as 0.01 ohm. The system, therefore, is believed to be useful in locating the erratic operation in servo-mechanisms and analogue computers as well as other circuit devices wherein the reliability of contact might be the factor introducing the erratic operation or be the factor in reducing the over-all sensitivity of the system.

While for the purpose of illustrating and describing the present invention certain specific components have been referred to, particularly in connection with the description of Figures 2a and 2b, it is to be understood that the invention is not to be limited thereby since such other components and such variations in the circuit arrangements are contemplated as may be commensurate with the spirit and scope of the invention set forth in the accompanying claims.

I claim as my invention:

1. The method of determining the resistance value of one leg of a three leg resistor network independently of the values of resistance of the other two legs of said network comprising applying a constant current source to one terminal of said first leg and to another terminal of said network, and measuring the resistance between said terminal of said first leg and the remaining terminal of said network.

2. The method of determining the resistance value of one leg of a Y resistor network irrespective of the values of resistance of the other legs of said network comprising applying a constant current source between two terminals of said network including said first mentioned leg, and applying a high impedance indicating circuit between the remaining terminal of said network and the terminal adjacent said first leg.

3. The method of determining parasitic transient resistance of the contact arm with a resistor element of a potentiometer comprising applying a source of constant current to one terminal of said resistor element and said arm, and measuring the voltage across the contact arm and the other terminal of said resistor element.

4. The method of determining parasitic transient resistance of the contact arm with the resistor element of potentiometers comprising applying a source of potential between one terminal of said resistor element and said arm, maintaining constant the current through said arm, moving said arm across said resistor element, and producing an indication whenever the parasitic transient resistance exceeds a predetermined threshold value.

5. A system for determining the resistance value of one leg of a Y connected resistor network independently of the values of resistance of the other two legs of network comprising a source of constant current connected to one terminal of said first leg and another terminal of said network, a high impedance circuit connected between the terminal of said first leg and the remaining terminal of said network, and means for indicating the response of said high impedance network to the resistance of said first leg.

6. A system for determining the parasitic transient resistance of a potentiometer contact arm with the resistance element thereof independently of the movement of and position of said arm on said element comprising a source of constant current applied to said arm and one terminal of said potentiometer, a high impedance circuit connected between said arm and the remaining terminal of said potentiometer, and means for indicating the response of said high impedance circuit to the resistance of said contact arm.

7. A system for testing potentiometers to determine whenever the parasitic transient resistance between the contact arm and the resistance element exceeds a predetermined value comprising a constant current source connected to the movable arm and one terminal of the resistance element, a voltage amplifier connected to said arm and the other terminal of the resistance element, a gate circuit controlled by said amplifier, a single shot multivibrator controlled by said gate circuit, and means controlled by said multivibrator for producing a visual signal and an audible signal whenever said predetermined value has been exceeded.

8. A system for testing potentiometers to determine whenever the parasitic transient resistance between the contact arm and the resistance element exceeds a predetermined value comprising a constant current source connected to the movable arm and one terminal of the resistance element, vacuum tube means including a one shot multivibrator, and means controlled by said multivibrator for producing a visual signal and an audible signal whenever said predetermined value has been exceeded irrespective of the transient characteristic of the parasitic resistance.

9. A system for testing potentiometers to determine whenever the parasitic transient resistance between the contact arm and the resistance element exceeds a predetermined value comprising a constant current source connected to the movable arm and one terminal of the resistance element, and vacuum tube means for producing a visual signal and an audible signal of known duration whenever said predetermined value has been exceeded irrespective of the transient characteristic of the parasitic resistance, said vacuum tube means being connected between the other terminal of the resistance element and said movable arm.

10. A system for testing potentiometers to determine whenever the parasitic transient resistance between the contact arm and the resistance element exceeds a predetermined value comprising a constant current source connected to the contact arm and one terminal of said resistance element, means connected to the other terminal of said resistance element and said contact arm including a gate circuit for determining the predetermined value of transient resistance, and means responsive to said gate circuit for producing a signal of known duration independently of the transient characteristic of the parasitic resistance.

11. A system for testing potentiometers to determine whenever the parasitic transient resistance between the contact arm and the resistance element exceeds a predetermined value comprising a constant current source connected to the contact arm and one terminal of said resistance element, high impedance means connected to the other terminal of said resistance element and said contact arm including a gate circuit for determining the predetermined value of transient resistance, and means responsive to said gate circuit for producing a visual signal of known duration independently of the transient characteristic of the parasitic resistance.

12. A system for testing potentiometers to determine whenever the parasitic transient resistance between the contact arm and the resistance element exceeds a predetermined value comprising a constant current source connected to the contact arm and one terminal of said resistance element, means connected to the other terminal of said resistance element and said contact arm including a gate circuit for determining the predetermined value of transient resistance, and electronic means responsive to said gate circuit for producing an audible signal of known duration independently of the transient characteristic of the parasitic resistance.

13. A system for testing potentiometers comprising a source of potential, means for supplying a constant current from said source to the contact arm and one terminal of the resistance element of a potentiometer, a high impedance circuit connected to said arm and the other terminal of said potentiometer, a gate circuit controlled by said high impedance circuit, a one shot multivibrator controlled by said gate circuit, an audio oscillator biased to cut off controlled by said multi-vibrator, and a loud speaker energized by said oscillator.

14. A system for testing potentiometers comprising a source of constant current, means for connecting said source to the contact arm and one terminal of the resistance element of a potentiometer, a high impedance circuit connected to said arm and the other terminal of the resistance element of said potentiometer, a gate circuit controlled by said high impedance circuit, a one-shot multi-vibrator controlled by said gate circuit, and a signal lamp energized in response to said multi-vibrator.

15. A system for testing potentiometers to determine whenever the equivalent parasitic transient resistance between the contact arm and the resistance element exceeds a predetermined value comprising a constant current source connected to the movable arm and one terminal of the resistance element, means connected to the movable arm and the other resistance terminal including a vacuum tube one shot multi-vibrator, and means controlled by said multi-vibrator for producing a signal of predetermined magnitude whenever said predetermined value has been exceeded irrespective of the transient characteristic on the parasitic resistance, the total resistance of the potentiometer, linearity or conformity, total angle, function, and resolution of the potentiometer.

16. The method of determining the equivalent noise resistance in a potentiometer comprising applying a source of constant current to one terminal of the resistor element and the contact arm, measuring the voltage across said contact arm and the other terminal of said resistor element, thereafter changing the value of said constant current and again measuring the voltage to determine the active and passive components of said equivalent noise resistance.

17. The method of determining the resistance value of one leg of a Y connected network comprising applying to two legs thereof successively constant currents of different values and successively measuring the potential appearing across the remaining leg and one of the first legs of said network.

18. The method of determining the resistance value of one leg of a Y connected network comprising applying to two legs thereof successively constant currents of different values, successively measuring the potential appearing across the remaining leg and one of the first legs of said network and comparing said measured potentials to determine the passive component of said resistance value.

References Cited in the file of this patent
UNITED STATES PATENTS

| | | |
|---|---|---|
| 988,441 | Burnham | Apr. 4, 1911 |
| 2,424,146 | Caldwell | July 15, 1947 |
| 2,453,462 | Sellers | Nov. 9, 1948 |
| 2,651,021 | Hays | Sept. 1, 1953 |
| 2,715,208 | Hayes | Aug. 9, 1955 |